(12) United States Patent
Meng

(10) Patent No.: US 12,177,425 B2
(45) Date of Patent: Dec. 24, 2024

(54) METHOD FOR PROCESSING IMAGES, METHOD FOR PROCESSING VIDEOS, COMPUTER DEVICE AND MEDIUM

(71) Applicant: BIGO TECHNOLOGY PTE. LTD., Singapore (SG)

(72) Inventor: Xiangfei Meng, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 253 days.

(21) Appl. No.: 17/629,132

(22) PCT Filed: Jul. 10, 2020

(86) PCT No.: PCT/CN2020/101243
§ 371 (c)(1),
(2) Date: Jan. 21, 2022

(87) PCT Pub. No.: WO2021/012965
PCT Pub. Date: Jan. 28, 2021

(65) Prior Publication Data
US 2022/0239908 A1    Jul. 28, 2022

(30) Foreign Application Priority Data

Jul. 23, 2019  (CN) .......................... 201910667696.6
Apr. 28, 2020  (CN) .......................... 202010348909.1

(51) Int. Cl.
*H04N 19/117*   (2014.01)
*G06V 10/26*    (2022.01)
(Continued)

(52) U.S. Cl.
CPC ........... *H04N 19/117* (2014.11); *G06V 10/26* (2022.01); *G06V 10/30* (2022.01); *G06V 10/467* (2022.01); *H04N 19/176* (2014.11)

(58) Field of Classification Search
None
See application file for complete search history.

(56) References Cited

U.S. PATENT DOCUMENTS 10,521,878 B1 *  12/2019  Medina, III ............ G06F 16/51
2015/0039637 A1 *  2/2015  Neuhauser ............. G06V 20/62
                                                           707/758

(Continued)

FOREIGN PATENT DOCUMENTS

CN    101043581 A    9/2007
CN    104103064 A    10/2014

(Continued)

OTHER PUBLICATIONS

International Search Report of the International Searching Authority for State Intellectual Property Office of the People's Republic of China in PCT application No. PCT/CN2020/101243 issued on Sep. 27, 2020, which is an international application corresponding to this U.S. application.

(Continued)

*Primary Examiner* — Xiaolan Xu
(74) *Attorney, Agent, or Firm* — Kolitch Romano Dascenzo Gates LLC

(57) ABSTRACT

A method for processing images includes: determining an image attribute of each image block of a plurality of image blocks in a to-be-processed image, determining a filter model corresponding to each of the image blocks based on the image attribute of each of the image blocks, and acquiring a filtered image of the to-be-processed image by filtering each of the image blocks by the filter model corresponding to each of the image blocks.

18 Claims, 5 Drawing Sheets

(51) Int. Cl.
*G06V 10/30* (2022.01)
*G06V 10/46* (2022.01)
*H04N 19/176* (2014.01)

(56) References Cited

U.S. PATENT DOCUMENTS

2016/0219231 A1    7/2016  Vanhoff
2018/0192870 A1*   7/2018  Inao .......................... G06T 5/50
2020/0372658 A1*  11/2020  De Winde ................. G06T 7/11

FOREIGN PATENT DOCUMENTS

| CN | 107527321 A | * | 12/2017 | ........... G06T 3/4053 |
| CN | 108550119 A |   | 9/2018  |                         |
| CN | 108765322 A |   | 11/2018 |                         |
| CN | 108765343 A |   | 11/2018 |                         |

OTHER PUBLICATIONS

The State Intellectual Property Office of People's Republic of China, First Office Action in Patent Application No. 202010348909.1 issued on Mar. 14, 2023, which is a foreign counterpart application corresponding to this U.S. Patent Application, to which this application claims priority.

* cited by examiner

METHOD FOR PROCESSING IMAGES, METHOD FOR PROCESSING VIDEOS, COMPUTER DEVICE AND MEDIUM

CROSS-REFERENCE TO RELATED APPLICATION

This application is a US national phase application of international application No. PCT/CN2020/101243, filed on Jul. 10, 2020, which claims priorities to Chinese Patent Application No. 201910667696.6, filed on Jul. 23, 2019 and Chinese Patent Application No. 202010348909.1, filed on Apr. 28, 2020, the disclosures of which are incorporated herein by reference in their entireties.

TECHNICAL FIELD

The present disclosure relates to the field of image processing, and in particular relates to a method for processing images, a method for processing videos on a mobile terminal, and a computer device and a medium thereof.

BACKGROUND

A video is typically encoded by means of lossy compression for storage and transmission, and this produces encoding noise when the video is decoded. The types of encoding noise include blocking, ringing, and aliasing effects. For example, when a user watches a video, a video application on a mobile terminal pulls a video stream from a server, and decodes and plays the video stream locally. Due to restrictions of network conditions, the video stream pulled to the mobile terminal is generally highly compressed, and visible encoding noise generally appears when the user watches the video, especially in a poor network condition.

In the field of image/video denoising, a common solution is to eliminate Gaussian white noise generated by a camera photoreceptor. Some other solutions are also available for eliminating the encoding noise.

SUMMARY

Embodiments of the present disclosure provide a method for processing images. The method includes:
  determining an image attribute of each image block of a plurality of image blocks in a to-be-processed image;
  determining a filter model corresponding to each of the image blocks based on the image attribute of each of the image blocks; and
  acquiring a filtered image of the to-be-processed image by filtering image block by the filter model corresponding to each of the image blocks.

Embodiments of the present disclosure provide a method for processing videos on a mobile terminal. The method includes:
  decoding a to-be-processed video pulled from a video stream;
  extracting a video frame from the to-be-processed video;
  acquiring a filtered image corresponding to the video frame by processing the video frame as a to-be-processed image with the method described in any one of the above embodiments; and
  playing the video with the filtered image.

Embodiments of the present disclosure provide an apparatus for processing images. The apparatus includes:
  a first determining module, configured to determine an image attribute of each image block of a plurality of image blocks in a to-be-processed image;
  a second determining module, configured to determine a filter model corresponding to each of the image blocks based on the image attribute of each of the image blocks; and
  a first filtering module, configured to acquire a filtered image of the to-be-processed image by filtering each of the image blocks by the filter model corresponding to each of the image blocks.

Embodiments of the present disclosure provide an apparatus for processing videos on a mobile terminal. The apparatus includes:
  a decoding module, configured to decode a to-be-processed video pulled from a video stream;
  an extracting module, configured to extract a video frame from the to-be-processed video;
  a processing module, configured to acquire a filtered image corresponding to the video frame by processing the video frame as the to-be-processed image by the method described in any one of the above embodiments; and
  a playing module, configured to play the video with the filtered image.

Embodiments of the present disclosure provide a computer device for processing images. The computer device includes:
  one or more processors; and
  a memory, configured to store one or more programs; wherein
  wherein the one or more processors, when running the one or more programs, is caused to perform the method for processing images as described in any one of the embodiments herein, or perform the method for processing videos on the mobile terminal as defined in any one of the embodiments herein.

Embodiments of the present disclosure provide a non-volatile computer-readable storage medium storing a computer program thereon, wherein the computer program, when run by a processor, causes the processor to perform the method for processing images as defined in any one of the embodiments of the present disclosure, or perform the method for processing videos on the mobile terminal as defined in any one of the embodiments of the present disclosure.

DETAILED DESCRIPTION

Figure 1:
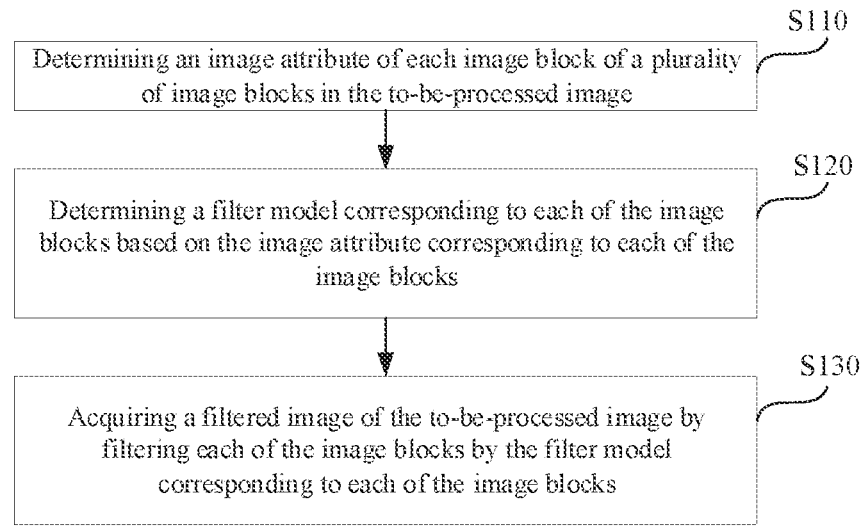
FIG. 1 is a flowchart of a method for processing images according to an embodiment of the present disclosure.

The present disclosure is described with reference to the accompanying drawings and examples. The embodiments described herein are to be considered in all respects only as illustrative and not restrictive. In addition, to simplify the description, only portions but not all of the structures associated with the present disclosure are shown in the drawings.

In the field of image/video denoising, a common solution is to eliminate Gaussian white noise generated by a camera photoreceptor. Some other solutions are also available for eliminating the encoding noise. However, in these solutions, a specific type of encoding noise, such as the blocking effect, is only addressed. Moreover, in recent years, efforts have been made to explore an encoding noise eliminating algorithm based on neural network, which achieves the effect of eliminating the encoding noise to an extent. However, the neural network needs enormous computation and thus has a low real-time performance.

Embodiments of the present disclosure may be applicable to eliminating visible encoding noise that typically occurs in the case that a user is watching a video due to the network conditions. Embodiments of the present disclosure provide a method for processing images, which enables real-time filtering of an image, and filters each image block adaptively by a corresponding filter model, so as to improve the definition of a video.

The filter model is trained prior to performing the method for processing images, such that a corresponding filter model can be determined based on an encoding noise intensity of a to-be-processed image and an image attribute of an image block in the to-be-processed image, and the image block is filtered using the filter model. The process of training the filter model includes: acquiring a high-definition image of a first preset size and a low-definition image carrying the encoding noise, wherein the high-definition image and the low-definition image have the same resolution, extracting a plurality of image blocks of a second preset size from the high-definition image and the low-definition image to compose a first matrix and a second matrix respectively, wherein the second preset size is less than the first preset size, and acquiring the filter model based on the first matrix and the second matrix based on a normal equation of Least Square method.

Optionally, the filter model in embodiments of the present application may be acquired based on the Least Squares calculation. It is assumed that there are L high-definition images in a size of M×N, and the i-th high-definition image is represented as $x_i$, where i=1, 2, ..., L; M and N represent the size of the high-definition image, and both M and N are positive numbers, for example, M represents a length of the high-definition image, and N represents a width of the high-definition image; L represents a positive integer greater than or equal to 1. Moreover, an image with the same resolution as the high-definition image but carrying encoding noise (referred to as a low-definition image) is acquired, and the i-th low-definition image is represented as $y_i$, where i=1, 2, ..., L. In addition, it is assumed that a filter model h in a size of d×d is trained to adjust a pixel value in the low-definition image $y_i$ to a corresponding pixel value in the high-definition image $x_i$, where d×d represents the size of the filter model. In the embodiment, a filter model h in a size of d×d indicates that the size of an input original image in the filtering operation is d×d.

The principle of training the filter model is to solve the following Least Squares problem, and the equation to be solved is:

$$\min \sum_{i=1}^{L} \|A_i h - b_i\|_2^2 \quad (1)$$

In Equation (1), $h \in R^{d^2}$ is a vectorized representation of $h \in R^{d \times d}$, $R^{d^2}$ represents a set of real vectors of dimension $d^2$, and h represents one real vector element in the set of real vectors. $A_i \in R^{MN \times d^2}$ represents a matrix composed of the image blocks in a size of d×d extracted from the low-definition image $y_i$, and the extraction includes, for each pixel, extracting one d×d image block centered on the pixel, and stretching the d×d image block into a row as a row of the matrix $A_i$; $R^{MN \times d^2}$ represents a set of real matrices of MN rows and $d^2$ columns, $A_i$ being one of the set of real matrices. $b_i \in R^{MN}$ is composed of an expansion of pixels of $X_i$, wherein each element in $b_i$ corresponds to a pixel in a central position of a plurality of d×d image blocks in the low-definition image $y_i$, $R^{MN}$ represents a set of real vectors of dimension MN, and $b_i$ represents one real vector element in the set of real vectors $R^{MN}$. $A_i$ and $b_i$ both correspond to the i-th low-definition image, and i=1, 2, ..., L, L represents a positive integer greater than or equal to 1. The method of training the optimal filter model can be easily extended from one figure to a plurality of figures, for the convenience of illustration, herein, the method of training the optimal filter model can be limited to one figure, and a superscript i is omitted. It can be interpreted that the filter model and the image block have the same size, that is, in the case that the size of the filter model is d×d, and the size of the image block is also d×d.

It can be learned from Equation (1) that A is a very large matrix, with a spatial complexity reaching $O(MNd^2)$. Therefore, Equation (1) can be transformed by the normal equation of the Least Squares method, that is the solution of Equation (1) is transformed into the solution of Equation (2):

$$\min \sum_{i=1}^{L} \|Qh - V\|_2^2 \quad (2)$$

In Equation (2), $Q = A^T A$, and $V = A^T b$. It can be derived that Q is a $d^2 \times d^2$ matrix, and V is a vector of dimension $d^2$. $A_j$ represents the j-th row of A, where $A_j \in$ then $d^{1 \times d^2}$, then both Q and V can be formed by accumulating small matrices/vectors. $R^{1 \times d^2}$ represents a set of real matrices of 1 row and $d^2$ columns, and $A_j$ is a real matrix in the set of real matrices $R^{1 \times d^2}$.

$$Q = A^T A = \sum_{j=1}^{MN} A_j^T A_j \qquad (3)$$

$$V = \sum_{j=1}^{MN} A_j^T b_j \qquad (4)$$

It can be derived that the spatial complexity of Equation (2), based on the accumulation fashion in Equation (3) and Equation (4), is $O(d^4)$, and to facilitate the statistics of the pixel value of each image block in the image, optionally, the value of d is set between 5 to 13. Therefore, the spatial complexity of Equation (2) is not large.

Based on the principle of Least Squares, Equation (2) can be transformed into equation to solve, i.e., Qh=V. The solution h to the equation is a filter model in the sense of Least Squares. Filtering the low-definition image with the filter model h can generate the high-definition image with encoding noise removed as much as possible, but it is difficult for the filter model to adjust adaptively for the content of the image. Therefore, a hashing classification is performed for each image block in the low-definition image, and a filter model is trained for each bucket of the hashing classification individually. Accordingly, in an actual operation of filtering the to-be-processed image, firstly, a first hash value and a second hash value corresponding to the image block of the low-definition image (i.e., a to-be-processed image) to be filtered currently, are calculated, a corresponding bucket sequence number is determined based on the first hash value and the second hash value, and filtering is performed by the filter model corresponding to the bucket sequence number.

Illustratively, the calculation of the first hash value and the second hash value for the image block is described for a d*d image block. The first hash value may be represented as $\theta$, and the second hash value may be represented as $\mu$. Further, $\theta$ can be calculated by Equation (5), and $\mu$ can be calculated by Equation (6).

$$\theta = \frac{\sum_{i=1}^{d}\sum_{j=1}^{d} LGx_{i,j}^2}{\sum_{i=1}^{d}\sum_{j=1}^{d} LGx_{i,j}^2 + \sum_{i=1}^{d}\sum_{j=1}^{d} LGy_{i,j}^2} \qquad (5)$$

$$\mu = \frac{\sum_{i=1}^{d}\sum_{j=1}^{d} LGx_{i,j} LGy_{i,j}}{\sum_{i=1}^{d}\sum_{j=1}^{d} LGx_{i,j}^2 + \sum_{i=1}^{d}\sum_{j=1}^{d} LGy_{i,j}^2} + 0.5 \qquad (6)$$

In Equation (5) and Equation (6), LGx and LGy represent image gradients in directions x and y of the image block respectively, the value of i is any one number of 1 to d, and the value of j is any one number of 1 to d, $LGx^2$ represents a square value of the image gradient corresponding to each image block in direction x, $LGy^2$ represents a square value of the image gradient corresponding to each image block in direction y, and LGxLGy represents a product value of the image gradients corresponding to each image block in directions x and y. Both $\theta$ and $\mu$ are in the range of [0, 1]. The interval [0, 1] is divided into $q_\theta$ subintervals and $q_\mu$ subintervals on average, where $q_\theta$ represents the number of subintervals corresponding to the first hash value, $q_\mu$ represents the number of subintervals corresponding to the second hash value, and the values of $q_\theta$ and $q_\mu$ can be customized Then, the combination of a subinterval taken arbitrarily from the $q_\theta$ subintervals and a subinterval taken arbitrarily from the $q_\mu$ subinterval is called a bucket, and each image block falls within a specific bucket. In order to ensure that all the image blocks falling in each bucket correspond to a filter model, the filter model for all the image blocks in each bucket needs to be trained in the case that the filter model is trained, and finally $q_\theta * q_\mu$ filter models can be acquired. Accordingly, in a solving process, $q_\theta * q_\mu$ matrices Q and vectors V need to be constructed, and corresponding $q_\theta * q_\mu$ Least Squares equations need to be solved.

In an embodiment, the process of training the filter model includes the following steps.

In S10, all image blocks in a size of d×d are traversed for the low-definition images in a training set.

In S20, a corresponding bucket sequence number is acquired by calculating the first hash value $\theta$ and the second hash value $\mu$ of each image block in the low-definition image.

In one embodiment, for example, $q_\theta=2$ and $q_\mu=4$, then the subintervals corresponding to the first hash value are [0, 0.5) and [0.5, 1], and the subintervals corresponding to the second hash value are [0, 0.25), [0.25, 5), [0.5, 0.75), and [0.75, 1]. One subinterval is selected from the subintervals corresponding to the first hash value and the subintervals corresponding to the second hash value respectively, and a combination of the two selected subintervals constitutes a bucket, hence 8 buckets are provided, for example, for [0, 0.5) and [0, 0.25), the corresponding bucket sequence number is 1; for [0, 0.5) and [0.25, 5), the corresponding bucket sequence number is 2; [0, 0.5), for [0.5, 0.75), the corresponding bucket sequence number is 3; for [0, 0.5) and [0.75, 1], the corresponding bucket sequence number is 4; for [0.5, 1] and [0, 0.25), the corresponding bucket sequence number is 5; for [0.5, 11 and [0.25, 5), the corresponding bucket sequence number is 6; for [0.5, 1] and [0.5, 0.75), the corresponding bucket sequence number is 7; for [0.5, 1] and [0.75, 1], the corresponding bucket sequence number is 8. Therefore, in response to the first hash value $\theta$ of an image block falling within the subinterval [0.5, 1] and the second hash value $\mu$ falling within the subinterval [0, 0.25), the corresponding bucket sequence number of the image block is 5.

In S30, based on Equation (3), the pixel value of the current image block is expanded into a row, i.e., $A_j$, and $A_j^T A_j$ is accumulated to the matrix Q corresponding to the bucket sequence number, according to the position of the image block, a pixel value $b_j$ of a corresponding position of a corresponding high-definition image is searched, and $A_j^T b_j$ is accumulated to the matrix V corresponding to the bucket sequence number.

In S40, upon traversing all the image blocks of the low-definition image, final Q and V of each bucket are acquired, and the equation Qh=V is solved to acquire the optimal filter model h corresponding to the bucket.

In S20, in the process of calculating $\theta$ and $\mu$ of each image block, in response to the calculation being conducted by "traversing the image blocks, and then calculating $\theta$ and $\mu$ based on the Equation," the time complexity is $O(MNd^2)$. However, in the Equation for calculating $\theta$ and $\mu$, the operation performed on each element of the image block is undifferentiated sum, in this case, the time complexity can be simplified to $O(MN)$ using an integral image algorithm. The first hash value and the second hash value are calculated as follows.

Firstly, based on the original file of the to-be-processed image, the image gradients of each to-be-processed image in directions x and y are acquired, that is, gradient graphs Gx and Gy, based on the gradient graphs Gx and Gy, a square value $Gx^2$ $Gx^2$ represents the square of Gx, i.e., an simplified form of $(Gx)^2$) of the image gradient corresponding to each to-be-processed image in direction x, a square value $Gy^2$ ($Gy^2$ represents the square of Gy, i.e., an simplified form of $(Gy)^2$) of the image gradient corresponding to each image in direction y, and a product value Gxy (Gxy represents s product value of Gx and Gy, i.e., an simplified form of Gx | G y) of the image gradient corresponding to each image in directions x and y are acquired, then, the integral images of the to-be-processed image are acquired using the integral image algorithm of $Gx^2$ $Gy^2$ and Gxy (the integral image refers to an image represented by two-dimensional matrices, for representing the integral of images), i.e., $I_{Gx^2}$, $I_{Gy^2}$ and $I_{Gxy}$, such that $$I_{Gx^2}(i, j) = \sum_{p=0}^{i} \sum_{q=0}^{j} Gx^2(p, q),$$

$$I_{Gy^2}(i, j) = \sum_{p=0}^{i} \sum_{q=0}^{j} Gy^2(p, q) \text{ and}$$

$$I_{Gxy}(i, j) = \sum_{p=0}^{i} \sum_{q=0}^{j} Gxy(p, q).$$

$$LS_{Gx^2}, LS_{Gy^2}, LS_{Gxy}$$

and portion of $Gx^2$, $Gy^2$ and Gxy of the to-be-processed image are calculated based on $I_{Gx^2}$, $I_{Gy^2}$ and $I_{Gxy}$, such that $LS_{Gx^2}(i, j)=I_{Gx^2}(i+l)-I_{Gx^2}(i-l)$, $LS_{Gy^2}(i,j)=I_{Gy^2}(i+l)-I_{Gy^2}(i-l)$, $LS_{Gxy}(i,j)=I_{Gxy}(i+l-I_{Gxy}(i-l)$, where $$l = \frac{d-1}{2}.$$

The first hash value θ and the second hash value μ of each d×d image block of a to-be-processed image are calculated with (i, j) as a center, i.e., $$\theta = \frac{LS_{Gx^2}(i, j)}{LS_{Gx^2}(i, j) + LS_{Gy^2}(i, j)}, \text{ and}$$

$$\mu = \frac{LS_{Gx}(i, j)}{LS_{Gx^2}(i, j) + LS_{Gy^2}(i, j)}.$$

The process of training the filter model is to train model offline for image quality enhancement, that is, to upgrade low-definition images to high-definition images. The model is a model file. An online video can then be filtered by the model file in real time to acquire a picture-quality-enhanced video. The method for processing images in the present embodiment is just the process of filtering each video frame in the online video in real time by the model file.

FIG. 1 is a flowchart of a method for processing images according to an embodiment of the present disclosure, and the method is applicable to any service terminal with image processing capabilities. The solution according to the embodiment of the present disclosure is applicable to the problem of how to denoise a current video frame to improve video definition under poor network conditions. The method for processing images may be performed by an apparatus for processing images according to an embodiment of the present disclosure, and the apparatus can be implemented by software and/or hardware, and integrated in an apparatus for performing the method, and the apparatus can be any server with image processing capabilities.

Referring to FIG. 1, the method may include the following steps.

In S110, an image attribute of each image block of a plurality of image blocks in the to-be-processed image is determined.

The image attribute includes a first hash value and a second hash value, the first hash value is configured to indicate a direction of an image gradient corresponding to each of the image blocks weighs more, and the second hash value is configured to indicate a proximity between the image gradient corresponding to each of the image blocks in a first direction and the image gradient corresponding to each of the image blocks in a second direction.

In an embodiment, each of the image blocks in the to-be-processed image may correspond to image gradients in two directions. In the embodiment, the image blocks are illustrated with the image gradients having x and y directions. The first hash value is configured to indicate whether the image gradient corresponding to each of the image blocks weighs more on direction x or direction y, and the second hash value is configured to indicate the proximity between the image gradient corresponding to each of the image blocks in direction x and the image gradient corresponding to each of the image blocks in direction y. In this embodiment, based on Equation (5), it can be learned that a greater θ indicates that the image gradient of the image block focuses more on direction x, and a smaller θ indicates that the image gradient of the image block focuses more on direction y. Based on Equation (6), it can be learned that in the case that μ is closer to 1, the proximity of the image block in directions x and y is greater, that is, the image gradients in directions x and y are closer.

In an embodiment, determining the image attribute of each image block of the plurality of image blocks in the to-be-processed image includes: calculating, based on the image gradient of each of the image blocks in the first direction and the image gradient of each of the image blocks in the second direction, a square value of the image gradient corresponding to each of the image blocks in the first direction, a square value of the image gradient corresponding to each of the image blocks in the second direction, and a product value of the image gradient corresponding to each of the image blocks in the first direction and the image gradient corresponding to each of the image blocks in the second direction, acquiring the first hash value and the second hash value corresponding to each of the image blocks by calculating the square value of the image gradient corresponding to the first direction, the square value of the image gradient corresponding to the second direction, and the product value of the image gradient corresponding to the first direction and the image gradient corresponding to the second direction based on an integral image algorithm.

Figure 2:
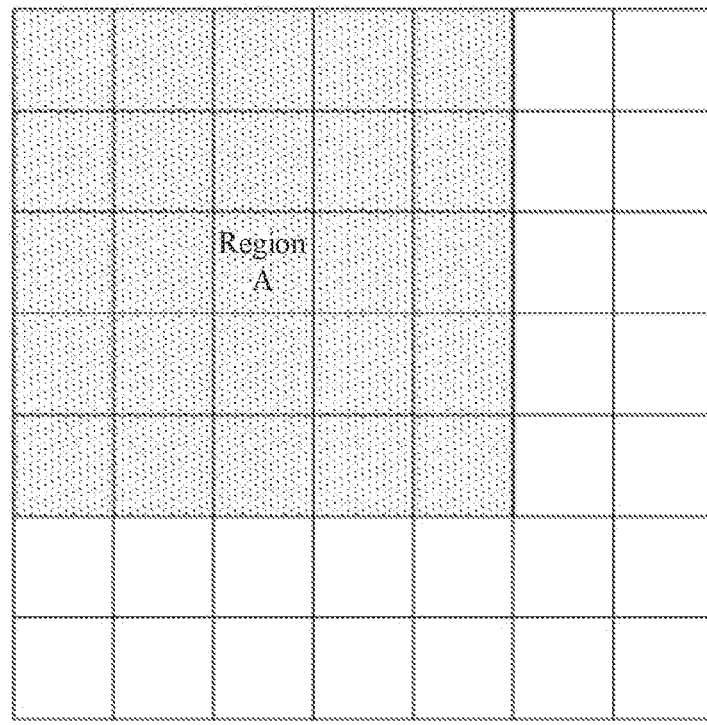
FIG. 2 is a schematic diagram for displaying a division of a to-be-processed image into image blocks according to an embodiment of the present disclosure.

In an embodiment, for determination of the filter model of each of the image blocks in the to-be-processed image, the image attributes of the image blocks in the to-be-processed image are firstly counted to identify a corresponding filter model. An image block of a preset size is extracted from the to-be-processed image, and the first hash value and the second hash value of each of the image blocks in the to-be-processed image are acquired by determining the image attribute of the image block described in the above embodiment. FIG. 2 is a schematic diagram for displaying a division of a to-be-processed image into image blocks according to an embodiment of the present disclosure. As shown in FIG. 2, it is assumed that the size of the to-be-processed image is 7*7, that is, the to-be-processed image has 49 pixel values, and a filter model in a size of 5*5 is taken as an example. In the case that the image block and the filter model have the same size, the size of each of the image blocks in the to-be-processed image is 5*5, and the to-be-processed image can be divided into 9 image blocks each having a size 5*5. For example, starting from the upper left corner of the to-be-processed image, the number of image blocks is counted, a pattern filling region A can be recorded as the first image block of the to-be-processed image, a new image block can be acquired by moving one pixel value to rightward or downward in sequence, and so on, the to-be-processed image can be divided into 9 image blocks each having the size of 5*5.

In the case that image blocks are extracted from the whole to-be-processed image, all the image blocks in the to-be-processed image are traversed, and then the first hash value and the second hash value of each of the image blocks are calculated based on the Equation for calculating the first hash value and the second hash value, that is, the image attribute of each of the image blocks in the to-be-processed image is determined.

In S120, a filter model corresponding to each of the image blocks is determined based on the image attribute corresponding to each of the image blocks.

In the case that the first hash value and the second hash value of each image block of the plurality of image blocks in the to-be-processed image are determined, the filter model corresponding to each of the image blocks can be determined based on the first hash value and the second hash value of each of the image blocks. In an embodiment, a mapping relationship is established between the image attribute and the filter model in advance, and in the case that the image attribute of each of the image blocks is determined, the filter model corresponding to each of the image blocks can be identified based on the mapping relationship between the image attribute and the filter model.

In S130, a filtered image of the to-be-processed image is acquired by filtering each image block by the filter model corresponding to each of the image blocks.

In an embodiment, in the case that the filter model of each image block is determined, each image block is filtered by the filter model to acquire the filtered image of each of the image block, thereby realizing adaptive filtering for each of the image blocks in each frame of the to-be-processed image, and thus improving the definition of the to-be-processed image.

To facilitate the illustration of a process of filtering the image block, in the embodiment, filtering the image block corresponding to a central point position (i, j) in the to-be-processed image is taken as an example to illustrate the process of filtering the image block. It is assumed that the position of the central point of the image block is (i, j), based on the first hash value $\theta$ and the second hash value $\mu$ of the image block, a filter model h of the image block is determined, and then the image block is filtered by the filter model h so as to acquire a target image $\tilde{x}$, $\tilde{x}(i, j) = A_k^T h$, where $A_k$ represents a row vector of pixels of the image block expanded into a row, $A_k^T$ represents a transpose vector of the row vector, and $\tilde{x}(i, j)$ represents a pixel of the target image at the position (i, j). The process of filtering other image blocks in the to-be-processed image is the same as the process described above, and is not repeated in detail here. In the case that each image block in the to-be-processed image is filtered, the target images corresponding to a plurality of image blocks are combined together to acquire the filtered image of the to-be-processed image.

In the method for processing images according to the embodiment of the present disclosure, the filtered image of the to-be-processed image is acquired by determining the image attribute of each image block of a plurality of image blocks in the to-be-processed image, the filter model corresponding to each of the image blocks is determined based on the image attribute of each of the image blocks, and the filtered image of the to-be-processed image is acquired by filtering each of the image blocks by the filter model corresponding to each of the image blocks. In the embodiment of the present disclosure, a rapid calculation is performed based on the image attribute of each image block in the to-be-processed image, the filtering of the image block is speeded up, thereby achieving real-time filtering of the image and improving the definition of the video by filtering each image block by a corresponding filter model adaptively.

The encoding noise intensity is configured to indicate the strength of the encoding noise contained in the to-be-processed image. In an actual operation process, taking the to-be-processed image in a video as an example, the encoding noise intensity of the video to which the to-be-processed image belongs can be taken as the encoding noise intensity of the to-be-processed image. The encoding noise intensities of different videos may be different, the encoding noise intensities of different images to be processed may also be different. Therefore, in the case that the filter model corresponding to each of the image blocks is determined, and the filter model corresponding to each of the image blocks is determined based on the encoding noise intensity of the to-be-processed image and the image attribute corresponding to each of the image blocks in the to-be-processed image, the determined filter model can be more accurate and more suitable to the characteristics of each of the image blocks, such that the filtering of each image is better implemented.

In an embodiment, prior to determining the filter model corresponding to each of the image blocks based on the image attribute corresponding to each of the image blocks, the method further includes: determining a plurality of filter models corresponding to the to-be-processed image according to the encoding noise intensity of the to-be-processed image, and determining the filter model corresponding to each of the image blocks based on the image attribute corresponding to each of the image blocks includes determining the filter model corresponding to each of the image blocks from the plurality of filter models corresponding to the to-be-processed image based on the image attribute of each of the image blocks in the to-be-processed image.

In an embodiment, prior to determining the plurality of filter models corresponding to the to-be-processed image according to the encoding noise intensity of the to-be-processed image, the method further includes: determining the encoding noise intensity of the to-be-processed image.

In an embodiment, determining the encoding noise intensity of the to-be-processed image includes: determining an encoding noise intensity of a video to which the to-be-processed image belongs, and determining the encoding noise intensity of the video to which the to-be-processed image belongs as the encoding noise intensity of the to-be-processed image.

In an embodiment, the correspondence between the level of the encoding noise intensity and the filter model may be established by a following process of training a filter model, and then a plurality of filter models corresponding to the level of the encoding noise intensity of the to-be-processed image may be determined according to the level of the encoding noise intensity of the to-be-processed image.

The process of training the filter model includes the following steps.

In S50, the low-definition images in a training set are divided into a corresponding number of training subsets based on the level of the encoding noise intensity.

In an embodiment, the training set may include a plurality of low-definition videos, and in response to the training set being dividing into the training subsets, the plurality of low-definition videos may be divided into a corresponding number of training subsets based on the levels of encoding noise intensities of the plurality of low-definition videos.

In S60, for the low-definition images in each of the training subsets, all image blocks in a size of d×d are traversed.

In S70, a corresponding bucket sequence number is acquired by calculating the first hash value $\theta$ and the second hash value $\mu$ of each of the image blocks in each of the training subsets.

In S80, based on Equation (3), the pixel value of the current image block is expanded into a row, i.e., $A_j$, and $A_j^T A_j$ is accumulated to the matrix Q corresponding to the bucket sequence number, according to the position of the image block, a pixel value $b_j$ of a corresponding position of a corresponding high-definition image is searched, and $A_j^T b_j$ is accumulated to the matrix V corresponding to the bucket sequence number, upon traversing all the image blocks of the low-definition image, final Q and V of each bucket are acquired, and the equation Qh=V is solved to acquire the optimal filter model h corresponding to the bucket.

In S90, all the training subsets are processed by the steps S60 to S80 to acquire an optimal filter model corresponding to each bucket in each training subset.

In the embodiment, the number of subintervals for the first hash values corresponding to different training subsets may be the same or different. The number of subintervals for the second hash values corresponding to different training subsets may be the same or different.

In the process of training the filter model, the low-definition images in the training set are classified according to the level of the encoding noise intensity, for example, the encoding noise intensity may be classified into three levels: strong, medium and weak, and according to the encoding noise intensity of the low-definition images in the training set, the low-definition images in the training set are correspondingly divided into three training subsets, and then the low-definition images in each training subset are trained to acquire the plurality of filter models corresponding to the plurality of buckets in each training subset, thereby the encoding noise intensity is also taken into account in the case that the filter model is trained, and the mapping relationship between the filter model and the encoding noise intensity is established, such that multiple filter models acquired by training the same training subset correspond to the same level of the encoding noise intensity. In response to determining the filter model of each of the image blocks in the to-be-processed image, a group(s) of filter models may be determined according to the level of the encoding noise intensity of the to-be-processed image, and then the final filter model is determined from the group(s) of filter models based on the image attribute of each of the image blocks. The determined filter model of each of the image blocks can filter each of the image blocks better.

In the embodiment, in the case that the corresponding plurality of filter models are determined according to the level of the encoding noise intensity of the to-be-processed image, a bucket sequence number corresponding to the image block can be determined based on the first hash value and the second hash value of each of the image blocks in the to-be-processed image, and then a filter model corresponding to the bucket sequence number is taken from the plurality of filter models as the filter model corresponding to the image block.

Figure 3:
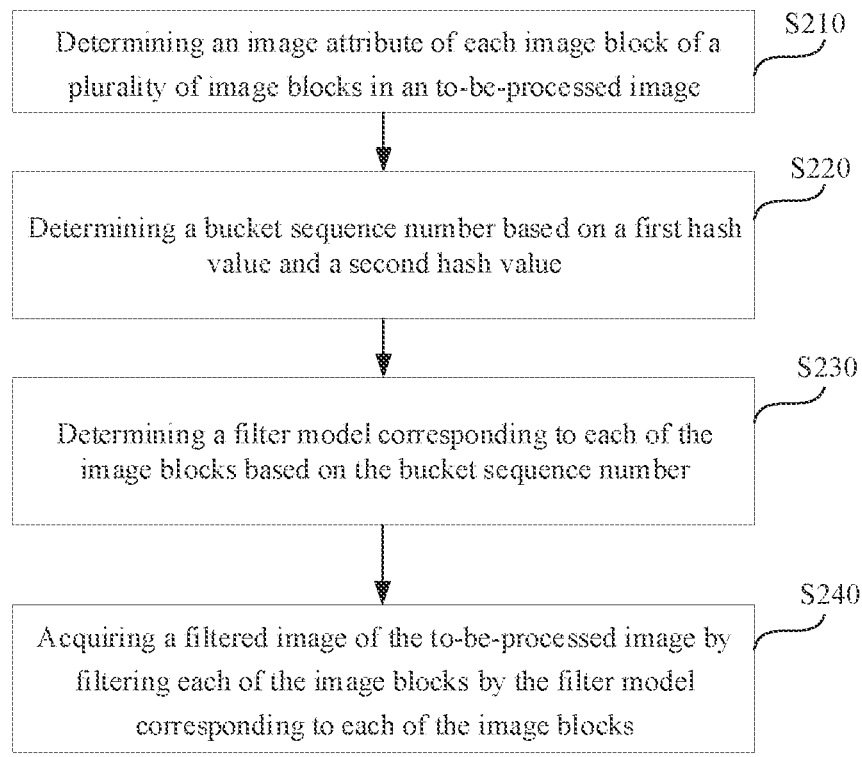
FIG. 3 is a flowchart of another method for processing images according to an embodiment of the present disclosure.

FIG. 3 is a flowchart of another method for processing images according to an embodiment of the present disclosure, which is described on the basis of the technical solution according to the above embodiment. The embodiment mainly explains a process of determining the filter model.

As shown in FIG. 3, the embodiment may include the following steps.

In S210, an image attribute of each image block of a plurality of image blocks in a to-be-processed image is determined.

In S220, a bucket sequence number is determined based on a first hash value and a second hash value.

In the case that the first hash value $\theta$ and the second hash value $\mu$ of each image block are acquired, the range [0, 1] of the first hash value $\theta$ and the second hash value $\mu$ are equally divided into $q_\theta$ and $q_\mu$ subintervals respectively. Therefore, each of the image blocks may have a corresponding bucket sequence number based on the $\theta$ and $\mu$ of the image block.

In S230, a filter model is determined corresponding to each of the image blocks based on the bucket sequence number.

In an embodiment, a one-to-one mapping relationship is established between the bucket sequence number and the filter model. One bucket sequence number corresponds to one filter model. In the case that the bucket sequence number of each of the image blocks is acquired, the corresponding filter model can be searched based on the mapping relationship between the bucket sequence number and the filter model.

In S240, a filtered image of the to-be-processed image is acquired by filtering each of the image blocks by the filter model corresponding to the image block.

In the technical solution according to the embodiment, based on the above embodiment, by searching the corresponding filter model based on the bucket sequence number determined by the first hash value and the second hash value of each image block, the filter model is correspondingly provided for each of the image blocks, such that each of the image blocks—is filtered adaptively, thereby improving the definition of the image.

Figure 4:
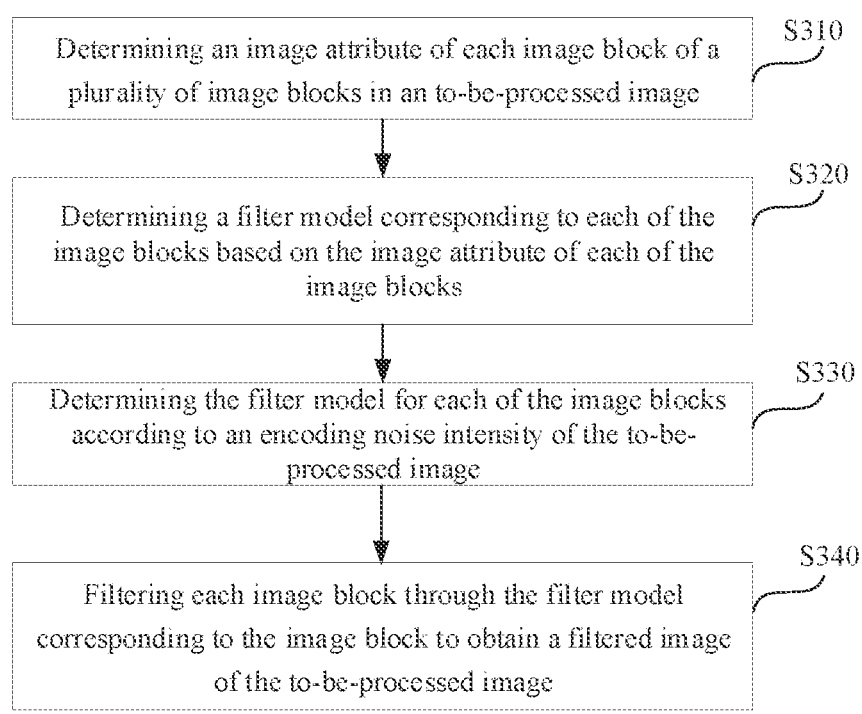
FIG. 4 is a flowchart of still another method for processing images according to an embodiment of the present disclosure.

FIG. 4 is a flowchart of yet another method for processing images according to an embodiment of the present disclosure. The embodiment describes a process of determining the filter model based on the above embodiment.

As shown in FIG. 4, the method includes the following steps.

In S310, an image attribute of each image block of a plurality of image blocks in a to-be-processed image is determined.

In S320, a filter model corresponding to each of the image blocks is determined based on the image attribute of each of the image blocks.

In S330, the filter model for each of the image blocks is determined according to an encoding noise intensity of the to-be-processed image.

The encoding noise intensity is configured to indicate the strength of the encoding noise contained in the to-beprocessed image. In practice, the encoding noise is not uniformly distributed in the whole to-be-processed image. In the case that the to-be-processed image is divided into a plurality of image blocks, the encoding noise intensities contained in each of the image blocks are not the same. In order to facilitate the determination of the filter model of the image block according to the encoding noise intensity of the to-be-processed image, one encoding noise intensity that is greater than others of the encoding noise intensities of a plurality of image blocks of a whole to-be-processed image may be taken as the encoding noise intensity of the to-be-processed image. For example, the encoding noise intensity of the to-be-processed image may be an average of the encoding noise intensities of all the image blocks in the whole to-be-processed image. The encoding noise intensity of the whole to-be-processed image may also be determined in other ways based on the encoding noise intensity of each of the image blocks, which is not limited herein.

In an embodiment, the method for determining the encoding noise intensity of the to-be-processed image includes: acquiring quality parameters of video encoding corresponding to the to-be-processed image, and determining the encoding noise intensity corresponding to the to-be-processed image based on the quality parameters. The quality parameters include at least one of a quantization parameter (QP) and a constant ratio factor (CRF). The QP is one of the video encoding parameters for describing the degree of loss of detail in the video encoding process. Moreover, a higher QP indicates more detail loss, and accordingly, the distortion of the to-be-processed image in the video is enhanced and the quality is degraded. The CRF is also a video encoding parameter that is similar to QP, but QP is a technical index in the encoding process, and CRF is a constant quality encoding mode, that is, described in terms of video quality, a determined CRF corresponds to a constant video quality. The value of CRF ranges generally from 18 to 28, and in an x264 encoder, a default value of CRF is 23. In an x265 encoder, the default value of CRF is 28.

In an embodiment, in the case that a performance test is performed on a video, QP and CRF of video encoding corresponding to the to-be-processed image can be acquired from an output log of the performance test. With QP and CRF of video encoding acquired, the encoding noise intensity corresponding to the video encoding is determined based on a preset mapping relationship between the encoding noise intensity and quality parameters. The corresponding encoding noise intensity may also be determined based on one of a plurality of quality parameters of the video encoding, that is, the encoding noise intensity corresponding to the video encoding is determined based on QP or CRF. Illustratively, the range of the encoding noise intensity is divided with the CRF having a value of 18 and 23. Assuming CRF<18, then the encoding noise intensity is in a weak stage; assuming 18<CRF<23, then the encoding noise intensity is in a medium stage; and assuming CRF>23, then the encoding noise intensity is in a strong stage. Different encoding noise intensities correspond to different filter models. It is also possible to establish a mapping relationship between QP and the encoding noise intensity, or establish a mapping relationship between a combination of QP and CRF and the encoding noise intensity. Then, according to the mapping relationship between different quality parameters and the encoding noise intensity, the encoding noise intensity corresponding to the video encoding corresponding to the to-be-processed image is determined, that is, the encoding noise intensity of the to-be-processed image is determined.

In the case that the encoding noise intensity of the to-be-processed image is determined, the filter model of the image block is determined according to an overall encoding noise intensity of the to-be-processed image. In this case, the filter models for each of the image blocks determined on the encoding noise intensity are the same.

In S340, the filtered image of the to-be-processed image is acquired by filtering each of the image blocks by the filter model corresponding to the image block.

In the case that the filter model of each image block determined according to the encoding noise intensity of the to-be-processed image, the whole to-be-processed image is adaptively filtered by the filter model. And a corresponding filter model is determined based on the image attribute of each of the image blocks, and each of the image blocks in the to-be-processed image is adaptively filtered by the filter model, and filtered images of each of the image blocks are combined to acquire the filtered image of the to-be-processed image.

In an actual operation, the whole to-be-processed image may be adaptively filtered by the filter model determined based on the encoding noise intensity of each frame of the to-be-processed image, and then each of the image blocks is adaptively filtered by the filter model determined based on the image attribute of each of the image blocks in the to-be-processed image. Each of the image blocks may also be adaptively filtered by the filter model determined based on the image attribute of each of the image blocks in the to-be-processed image, and then the whole to-be-processed image may be filtered adaptively by the filter model determined based on the encoding noise intensity of each frame of the to-be-processed image. The sequence of the two steps is not limited.

Step S330 may be performed prior to step S310 or S320 as long as step S330 is performed prior to step S340.

In the technical solution according to this embodiment, based on the above embodiment, the filter model is determined according to the encoding noise intensity of the to-be-processed image so as to filter each frame of the to-be-processed image adaptively, thereby improving the definition of the video.

The process of filtering the to-be-processed image adaptively is equivalent to a process of performing weighted averaging on pixel values of an image block. Therefore, in the case that a white text region such as a subtitle is included in the to-be-processed image, the white text region becomes lighter. For reduction of the influence of encoding denoising on the white text region as much as possible, the white text region can be binarized to acquire a binarized image. Based on the above embodiment, the method further includes acquiring a binarized image of the to-be-processed image by binarizing the to-be-processed image.

Acquiring the binarized image of the to-be-processed image by binarizing the to-be-processed image includes steps S100 to S300.

In S100, a text boundary image is acquired by performing Laplace filtering on the to-be-processed image.

The to-be-processed image is the original low-definition image, recorded as y. Laplacian filtering is performed on the original low-definition image so as to acquire the text boundary image, recorded as T1. An RGB value of 0 in the text boundary image indicates that the region is a flat region and is almost impossible to be text. A greater RGB value indicates a greater likelihood that the location is a text boundary. However, the text boundary of the filtered image is not clear, and gaps and slits exist, and some other non-text boundary regions exist in the text boundary image.

In S200, a first image is acquired by performing threshold segmentation on the text boundary image based on a preset pixel threshold.

The first image is an image with non-text boundary regions removed from the text boundary image. It should be understood here that the boundary within the text region is sharper, and the pixel values of the text region upon the Laplace filtering are relatively greater, and the pixel values of the non-text region are smaller. Therefore, in this case, a pixel threshold, recorded as th, may be set, and then the threshold segmentation is performed on the text boundary image so as to remove the non-text boundary region from the text boundary image and acquire the image with non-text boundary regions removed from the text boundary image, recorded as a first image T2.

Step S200 may include steps S2002 to S2008.

In S2002, a pixel value corresponding to each pixel point in the text boundary image is compared with the preset pixel threshold.

In S2004, the pixel value corresponding to the pixel point greater than the pixel threshold is adjusted to a first pixel value.

In S2006, the pixel value corresponding to the pixel point less than or equal to the pixel threshold is adjusted to a second pixel value.

In S2008, the text boundary image with the pixel values adjusted is determined as the first image.

In the embodiment, the text boundary image with the pixel values adjusted is determined as the first image, that is, the pixel value corresponding to the pixel point greater than the pixel threshold is adjusted to a first pixel value, and the pixel value corresponding to the pixel point less than or equal to the pixel threshold is adjusted to a second pixel value, so as to acquire the first image.

In an embodiment, a mathematical expression for the threshold segmentation may be set as follows:

$$T2(i, j) = \begin{cases} 255, & T1(i, j) > th \\ 0, & T1(i, j) \leq th \end{cases}$$

In the above Equation, T1(i, j) represents a pixel value of a text boundary image corresponding to an image block at a position (i, j) in the to-be-processed image, T2 (i, j) represents a pixel value of the text boundary image upon the threshold segmentation corresponding to the image block at the position (i, j) in the to-be-processed image. The first pixel value is 255, and the second pixel value is 0. In the embodiment, the pixel values of all the pixel points in the text boundary image are adjusted to 0 or 255, so as to remove non-text boundary regions and acquire the first image. The first image is also a binarized image, but is not sharp and contains a discontinuous text boundary.

In S300, the binarized image is acquired by performing a morphological close operation on the first image.

The morphological close operation may eliminate narrow gaps and small holes. The morphological close operation may fill the small holes among objects, connect adjacent objects, and smooth a boundary. A process of performing the morphological close operation on the first image includes: acquiring a dilated image by dilating the first image, and acquiring the binarized image by eroding the dilated image. In an embodiment, the morphological close operation is performed on a first image T2 to acquire a binarized image recorded as T3, such that unclear and discontinuous text region boundaries can be connected to be complete.

Upon acquiring the binarized image, the method further includes performing mean filtering on the binarized image. Performing mean filtering on the binarized image upon the binarized image can smooth the sharp boundary of the text region to render a smooth transition.

Figure 5:
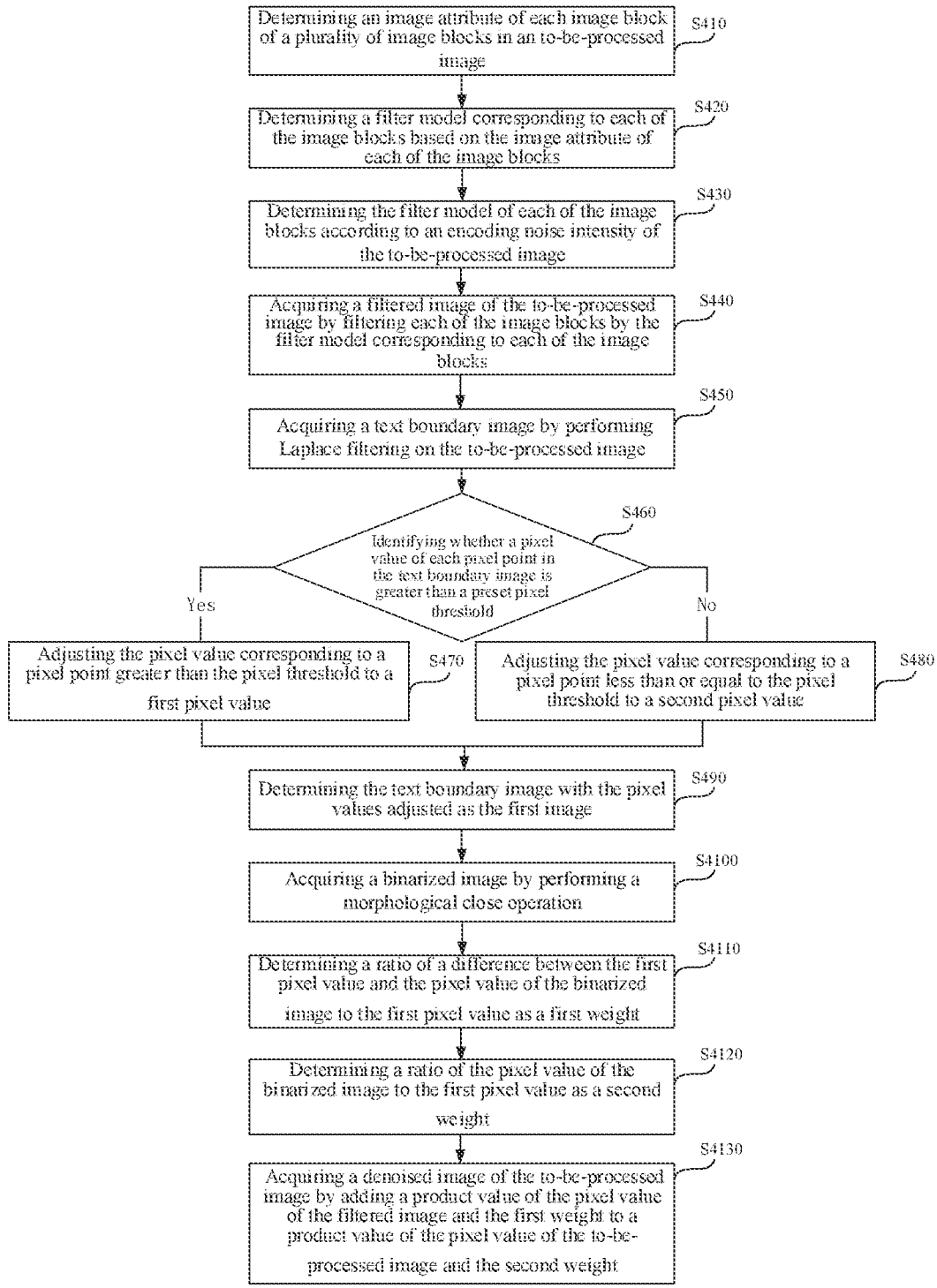
FIG. 5 is a flowchart of still another method for processing images according to an embodiment of the present disclosure.

Based on the above embodiment, a process of combining the denoised images of the to-be-processed image is explained. FIG. 5 is a flowchart of still another method for processing images according to an embodiment of the present disclosure.

As shown in FIG. 5, the method includes the following steps.

In S410, an image attribute of each image block of a plurality of image blocks in a to-be-processed image is determined.

In S420, a filter model corresponding to each of the image blocks is determined based on the image attribute of each of the image blocks.

In S430, the filter model of each of the image blocks is determined according to an encoding noise intensity of the to-be-processed image.

In S440, a filtered image of the to-be-processed image is acquired by filtering each image block by the filter model corresponding to each of the image blocks.

In S450, a text boundary image is acquired by performing Laplace filtering on the to-be-processed image.

In S460, whether a pixel value of each pixel point in the text boundary image is greater than a preset pixel threshold is identified, performing step S470 in response to an identification result that the pixel value of each pixel point in the text boundary image is greater than the preset pixel threshold, and performing step S480 in response to the identification result that the pixel value of each pixel point in the text boundary image is less than or equal to the preset pixel threshold.

In S470, the pixel value corresponding to a pixel point greater than the pixel threshold is adjusted to a first pixel value.

In S480, the pixel value corresponding to a pixel point less than or equal to the pixel threshold is adjusted to a second pixel value.

In S490, the text boundary image with the pixel values adjusted is determined as the first image.

In S4100, a binarized image is acquired by performing a morphological close operation on the first image.

In S4110, a ratio of a difference between the first pixel value and the pixel value of the binarized image to the first pixel value is determined as a first weight.

In S4120, a ratio of the pixel value of the binarized image to the first pixel value is determined as a second weight.

In S4130, a denoised image of the to-be-processed image is acquired by adding a product value of the pixel value of the filtered image and the first weight to a product value of the pixel value of the to-be-processed image and the second weight.

In an embodiment, the Equation for combining the denoised images may be $$\tilde{x} = \tilde{x} * \frac{(255 - T)}{255} + y * \frac{T}{255},$$

where y represents a pixel value of an original low-definition image, T represents a pixel value of a binarized image T3, $\tilde{x}$ represents a pixel value of the denoised image of the to-be-processed image.

$$\frac{(255-T)}{255}$$

represents the first weight, and $$\frac{T}{255}$$

represents the second weight. In the case that the pixel value of the binarized image is 255, the denoised image of the to-be-processed image is an original low-definition image. In the case that the pixel value of the binarized image is 0, the denoised image of the to-be-processed image is a filtered image by adaptive filtering.

The step of acquiring the binarized image by performing Laplace filtering on the to-be-processed image to, i.e., steps S450 to S4100, may be performed simultaneously with the step of acquiring the filtered image of the to-be-processed image, i.e., steps S410 to S440. It is interpreted that the sequence of preforming steps S410 to S440 and S450 to S4100 is not limited herein as long as steps S410 to S440 and S450 to S4100 are performed prior to step S4110.

In the technical solution according to the embodiment, by binarizing the text region in the to-be-processed image, the influence of encoding denoising on the text region is reduced as much as possible, which avoids lightening of the text region, the definition of the images in the video is ensured and subtitles in the video can keep clear and distinct.

Figure 6:
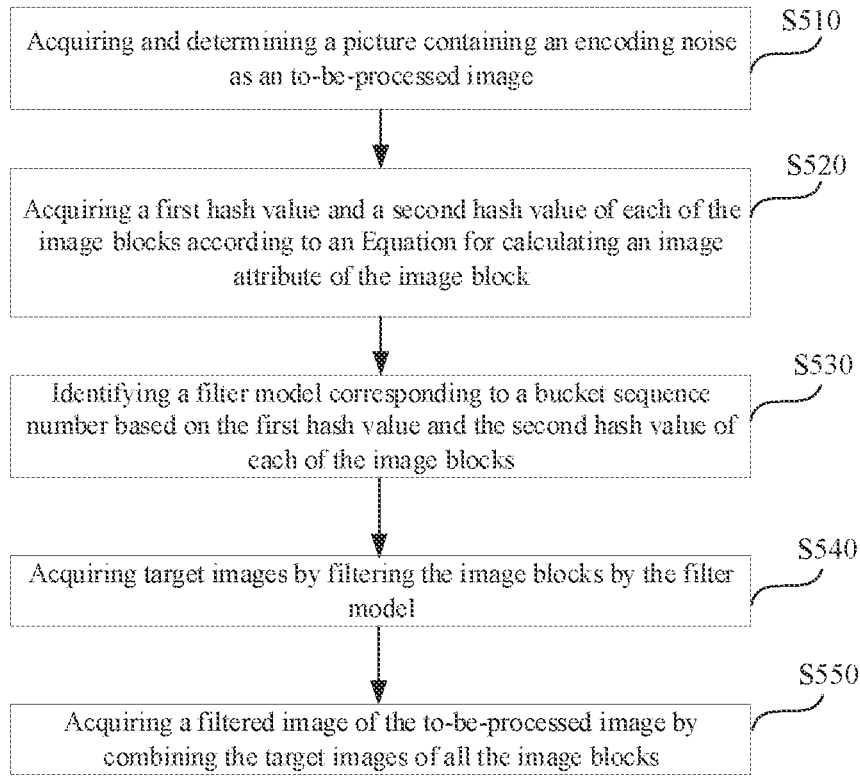
FIG. 6 is a flowchart of filtering the image block in the method for processing images according to an embodiment of the present disclosure.

FIG. 6 is a flowchart of a step of filtering the image block in the method for processing images according to an embodiment of the present disclosure. Based on the above embodiment, the process of filtering each image block in the method for processing images is explained herein. In the embodiment, an example is described in which the method for processing images is applied to a mobile terminal, and the mobile terminal may be a smartphone, an iPad, a laptop, etc.

As shown in FIG. 6, the method includes the following steps.

In S510, a picture containing an encoding noise is acquired and determined as a to-be-processed image.

In S520, a first hash value and a second hash value of each of the image blocks is acquired according to an Equation for calculating an image attribute of the image block.

In S530, a filter model corresponding to a bucket sequence number is identified based on the first hash value and the second hash value of each of the image blocks.

In S540, target images are acquired by filtering the image blocks by the filter model.

In S550, a filtered image of the to-be-processed image is acquired by combining the target images of all the image blocks to obtain.

The technical solution according to the embodiment improves the efficiency of calculating the first hash value and the second hash value of the image block by defining new image local features and applying a fast calculation method, such that in the case that a mobile terminal pulls a video carrying a strong encoding noise, upon decoding of the video and prior to playing of the video, the encoding noise of a current video frame in the video and any type of encoding noise in the video can be eliminated in real time.

In the application fields such as video live-streaming and short video, the encoding noise intensity varies with the network conditions. In this case, the encoding noise with different intensities can be processed. In response to training the filter model, training sets with different encoding noise intensities can be constructed and trained separately to acquired multiple filter models. Therefore, in an actual operation of the image processing, different filter models can be applied for filtering depending on the quality parameters of the video encoding, such as QP and/or CRF.

An embodiment of the present disclosure provides a method for processing videos on a mobile terminal, and the method is applicable to any mobile terminal with a video processing function. The method for processing videos on the mobile terminal may be performed by an apparatus for processing videos on a mobile terminal according to an embodiment of the present disclosure, and the apparatus can be implemented by software and/or hardware, and integrated in a device for performing the present method, and the device can be any mobile terminal with video processing capabilities.

Figure 7:
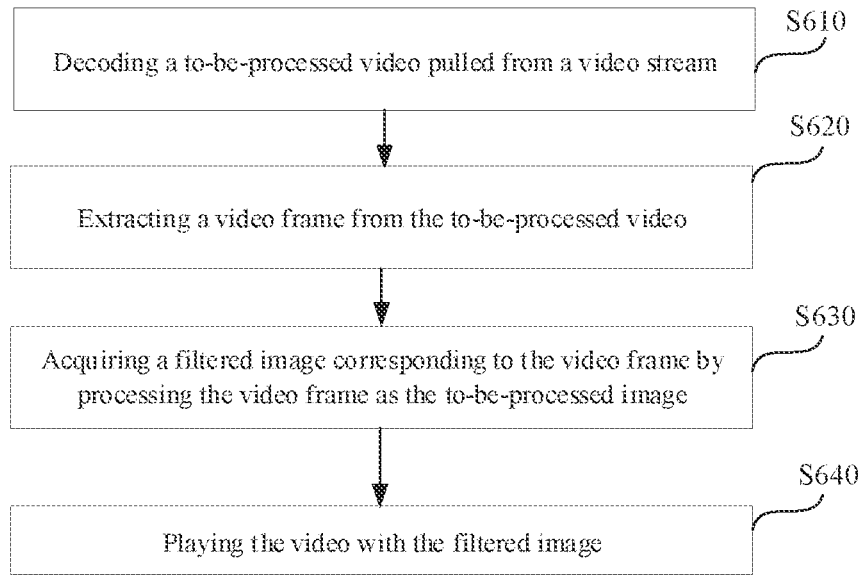
FIG. 7 is a flowchart of a method for processing videos on a mobile terminal according to an embodiment of the present disclosure.

FIG. 7 is a flowchart of a method for processing videos on a mobile terminal according to an embodiment of the present disclosure, and as shown in FIG. 7, the method includes the following steps:

In S610, a to-be-processed video pulled from a video stream is decoded.

In S620, a video frame is extracted from the to-be-processed video.

In S630, a filtered image corresponding to the video frame is acquired by processing the video frame as the to-be-processed image.

In S640, the video with the filtered image is played.

In an embodiment, in the case that a user watches a video, an application (App) on a mobile terminal needs to pull a video stream from a server, acquire and decode a to-be-processed video in the video stream, identify and extract a current video frame in the to-be-processed video, and determine the current video frame as a to-be-processed image, and perform the method for processing images described in any one of the above embodiments to acquire a filtered image of the current video frame by filtering and denoising the current video frame. Then, the corresponding current video frame in the to-be-processed video is updated by the denoised image, and the video is played, which improves the definition of video is improved. Because the method for processing images of the above embodiment is fast in calculation and efficient in denoising, the application of the method on a mobile terminal can meet the real-time processing requirements for video frame processing and video playing, thereby improving the functionality of the mobile terminal and the experience of the user.

The technical solution according to the embodiment, by filtering a video frame in a video stream adaptively, not only better eliminates the encoding noise, but also enables adaptation to current network conditions and binarizes subtitles on the video frame so as to keep the subtitles clean and distinct, thereby improving the user experience, even in a restricted network environment.

The embodiment of the present disclosure improves the efficiency of denoising a video to denoise a video in real time, and renders a higher definition of the video watched by the user.

Figure 8:
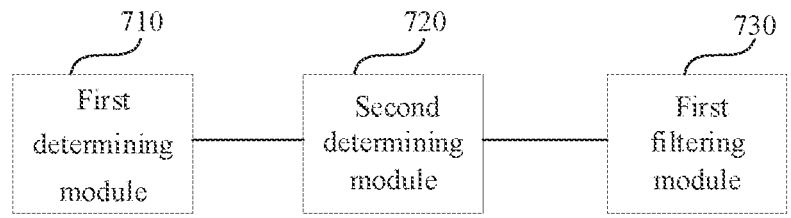
FIG. 8 is a schematic structural diagram of an apparatus for processing images according to an embodiment of the present disclosure.

FIG. 8 is a schematic structural diagram of an apparatus for processing images according to an embodiment of the present disclosure, and as shown in FIG. 8, the apparatus may include a first determining module 710, a second determining module 720, and a first filtering module 730.

The first determining module 710 is configured to determine an image attribute of each image block of a plurality of image blocks in a to-be-processed image, the second determining module 720 is configured to determine a filter model corresponding to each of the image blocks based on the image attribute of each of the image blocks, the first filtering module 730 is configured to acquire a filtered image of the to-be-processed image by filtering each of the image blocks by the filter model corresponding to each of the image blocks.

In the method for processing images according to the embodiment of the present disclosure, the filtered image of the to-be-processed image is acquired by determining the image attribute of each image block of the plurality of image blocks in the to-be-processed image, the filter model corresponding to each of the image blocks is determined based on the image attribute of each of the image blocks, and each of the image blocks is filtered by the filter model corresponding to each of the image block. In the embodiment of the present disclosure, the filtering of the image block is speeded up by rapid calculation based on the image attribute of each of the image blocks in the to-be-processed image, thereby realizing real-time filtering of the image and improving the definition of the video by filtering each of the image blocks by a corresponding filter model adaptively.

Based on the above embodiment, the image attribute includes a first hash value and a second hash value. The first hash value is configured to indicate a direction on which an image gradient corresponding to each of the image blocks weighs more, and the second hash value is configured to indicate a proximity between the image gradient corresponding to each of the image blocks in a first direction and the image gradient corresponding to each of the image blocks in a second direction.

Based on the above embodiment, the first determining module 710 is configured to determine an image attribute of each of the image blocks of a plurality of image blocks in a to-be-processed image by the following method. The method includes: calculating, based on the image gradient of each of the image blocks in the first direction and the image gradient of each of the image blocks in the second direction, a square value of the image gradient corresponding to each of the image blocks in the first direction, a square value of the image gradient corresponding to each of the image blocks in the second direction, and a product value of the image gradient corresponding to each of the image blocks in the first direction and the image gradient corresponding to each of the image blocks in the second direction; and acquiring the first hash value and the second hash value corresponding to each of the image blocks by calculating the square value of the image gradient corresponding to the first direction, the square value of the image gradient corresponding to the second direction, and the product value of the image gradient corresponding to the first direction and the image gradient corresponding to the second direction based on an integral image algorithm.

Based on the above embodiment, the second determining module 720 includes: a first determination unit, configured to determine a bucket sequence number based on the first hash value and the second hash value corresponding to each of the image blocks, and a second determination unit, configured to determine a filter model corresponding to each of the image blocks based on the bucket sequence number.

Based on the above embodiment, the apparatus for processing images further includes a third determining module, configured to determine a filter model of each of the image blocks according to an encoding noise intensity of the to-be-processed image.

Based on the above embodiment, the first filtering module 730 is configured to acquire a filtered image of the to-be-processed image by filtering each of the image blocks by a target model corresponding to each of the image block, wherein the target model corresponding to each of the image blocks includes the filter model of each of the image blocks determined according to the encoding noise intensity of the to-be-processed image and the filter model corresponding to each of the image blocks determined based on the image attribute of each of the image blocks.

Based on the above embodiment, the method for determining encoding noise intensity of the to-be-processed image includes acquiring quality parameters of video encoding corresponding to the to-be-processed image, and determining the encoding noise intensity of the to-be-processed image based on the quality parameters.

Based on the above embodiment, the apparatus for processing images further includes: a processing module, configured to acquire a binarized image of the to-be-processed image by binarizing the to-be-processed image.

Based on the above embodiment, the processing module includes: a filtering unit, configured to acquire a text boundary image by performing Laplace filtering on the to-be-processed image, a segmenting unit, configured to acquire a first image by performing threshold segmentation on the text boundary image based on a preset pixel threshold, wherein the first image is an image in which a non-text boundary region is removed from the text boundary image, and a close operation, unit configured to acquire a binarized image by performing a morphological close operation on the first image.

Based on the above embodiment, the apparatus for processing images further includes: a second filtering module, configured to, upon acquiring the binarized image, perform mean filtering on the binarized image.

Based on the above embodiment, the closed operating unit includes: a first operation subunit, configured to acquire a dilated image by dilating the first image, and a second operation subunit, configured to acquire the binarized image by eroding the dilated image.

Based on the above embodiment, the segmenting unit includes: a comparing subunit, configured to compare a pixel value corresponding to each pixel point in the text boundary image with a preset pixel threshold, a first adjusting subunit, configured to adjust the pixel value corresponding to a pixel point greater than the pixel threshold to a first pixel value, a second adjusting subunit, configured to adjust the pixel value corresponding to a pixel point less than or equal to the pixel threshold to a second pixel value, and a combining subunit, configured to determine the text boundary image with the pixel values adjusted as the first image.

Based on the above embodiment, the apparatus for processing images further includes: a first weight determining module, configured to determine a ratio of a difference between the first pixel value and a pixel value of the binarized image to the first pixel value as a first weight, a second weight determining module, configured to determine a ratio of the pixel value of the binarized image to the first pixel value as a second weight, and a denoising module, configured to acquire a denoised image by adding a product value of the pixel value of the filtered image and the first weight to a product value of the pixel value of the to-be-processed image and the second weight.

Based on the above embodiment, the process of training the filter model includes: acquiring a high-definition image of a first preset size and a low-definition image carrying an encoding noise, wherein the high-definition image and the low-definition image have a same resolution, extracting a plurality of image blocks of a second preset size from the high-definition image and the low-definition image to compose a first matrix and a second matrix respectively, wherein the second preset size is less than the first preset size, and acquiring the filter model based on the first matrix and the second matrix based on a normal equation of Least Square method.

Based on the embodiments described above, the filter model and the image block have the same size.

Based on the above embodiment, the apparatus for processing images further includes: a fourth determining module, configured to determine the filter models corresponding to a to-be-processed image according to an encoding noise intensity of the to-be-processed image, and the second determining module 720, configured to determine the filter model corresponding to each image block from the plurality of filter models corresponding to the to-be-processed image based on the image attribute of each of the image blocks in the to-be-processed image.

The apparatus for processing images is applicable to the method for processing images according to any embodiment of the present disclosure.

Figure 9:
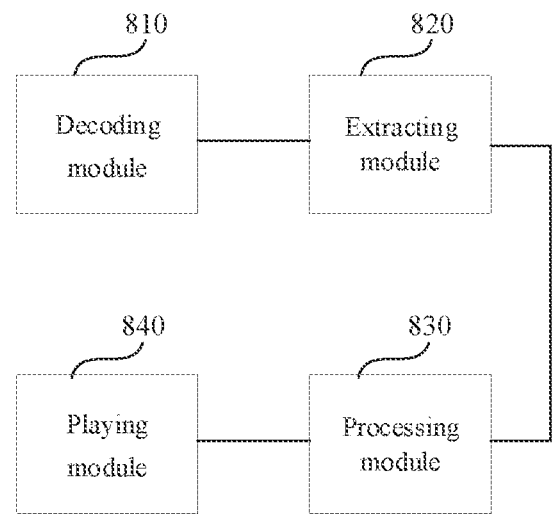
FIG. 9 is a schematic structural diagram of an apparatus for processing videos on a mobile terminal according to an embodiment of the present disclosure.

FIG. 9 is a schematic structural diagram of an apparatus for processing videos on a mobile terminal according to an embodiment of the present disclosure. As shown in FIG. 9, the apparatus includes a decoding module 810, an extracting module 820, a processing module 830, and a playing module 840.

The decoding module 810 is configured to decode a to-be-processed video pulled from a video stream, the extracting module 820 is configured to extract a video frame from the to-be-processed video, the processing module 830 is configured to acquire a filtered image corresponding to the video frame by processing the video frame as a to-be-processed image by the method described in any one of the above embodiments, and the playing module 840 is configured to play the video with the filtered image.

The technical solution according to the embodiment improves the efficiency of denoising a video by denoising the current video frame in the video, realizing the real-time denoising of the video, and renders a higher definition of the video watched by the user, thereby improving the user experience.

The apparatus for processing videos on the mobile terminal is applicable to the method for processing videos on the mobile terminal according to any embodiment of the present disclosure.

Figure 10:
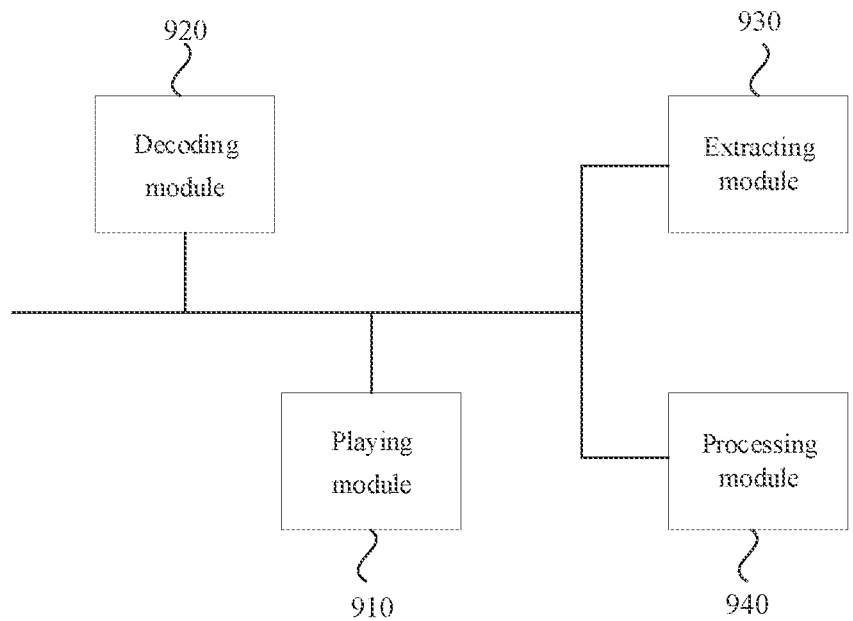
FIG. 10 is a schematic structural diagram of a computer device according to an embodiment of the present disclosure.

FIG. 10 is a schematic structural diagram of a computer device according to an embodiment of the present disclosure. As shown in FIG. 10, the computer device includes a processor 910, a memory 920, an input device 930, and an output device 940. The processor 910 in the computer device may be one or more. One processor 910 is exemplified in FIG. 10, and the processor 910, the memory 920, the input device 930, and the output device 940 in the computer device may be connected via a bus or otherwise, and the connection via is exemplified a bus in FIG. 10.

The memory 920 in the computer device, as a computer-readable storage medium, can be configured to store one or more programs, wherein the programs can be software programs, computer-executable programs and modules, such as the program instructions/modules corresponding to the method for processing images according to an embodiment of the present disclosure (for example, the modules in the apparatus for processing images shown in FIG. 8 including the first determining module 710, the second determining module 720 and the first filtering module 730). The processor 910 executes various functional applications of the computer device and data processing by running software programs, instructions and modules stored in the memory 920, that is, to implement the method for processing images in the above method embodiment.

The memory 920 may include a program storage partition and a data storage partition, wherein the program storage partition may store an operating system and an application program required for at least one function, and the data storage partition may store data created according to the use of the computer device or the like. In addition, the memory 920 may include a high-speed random-access memory and a non-volatile memory, such as at least one magnetic disk storage device, flash memory device, or other non-volatile solid state storage device. In some embodiments, the memory 920 may further include a memory arranged remotely relative to the processor 910, which may be connected to the computer device via a network. Examples of such networks include, but are not limited to, the Internet, intranets, local area networks, mobile communication networks, and combinations thereof.

The input device 930 may be configured to receive numeric or character information input by a user to generate key signal inputs related to user settings and function controls of the terminal device. The output device 940 may include a display device such as a monitor.

Furthermore, in the case that one or more programs included in the device are executed by one or more processors 910, the programs perform the following operation, including determining the image attribute of each image block of a plurality of image blocks in the to-be-processed image, determining the filter model corresponding to each of the image blocks based on the image attribute of each of the image blocks, and acquiring the filtered image of the to-be-processed image by filtering each of the image blocks by the filter model corresponding to each image block.

The computer device may be configured to perform the method for processing images according to any one of the embodiments of the present disclosure.

In an embodiment, the computer device may be configured to perform the method for processing videos on the mobile terminal according to any embodiment of the present disclosure.

An embodiment of the present disclosure further provides a non-volatile computer-readable storage medium storing a computer program therein. The computer program, when run by a processor, causes the processor to perform the method for processing images or the method for processing videos on the mobile terminal according to any one of the embodiments of the present disclosure. The method for processing images may include: determining the image attribute of each image block of a plurality of image blocks in the to-be-processed image, determining the filter model corresponding to each of the image blocks based on the image attribute of each of the image blocks, and acquiring the filtered image of the to-be-processed image by filtering each of the image block by the filter model corresponding to each of the image blocks.

The method for processing videos on the mobile terminal includes: decoding a to-be-processed video pulled from a video stream, extracting a video frame from the to-be-processed video, acquiring a filtered image corresponding to the video frame by processing the video frame as the to-be-processed image by the method described in any one of the above embodiments, and playing the video with the filtered image.

An embodiment of the present disclosure further provides a storage medium storing one or more computer-executable instructions therein. Not limited to the operations of the methods as described above, the one or more computer-executable instructions may also be executed to perform relevant operations in the method for processing images or the method for processing videos on the mobile terminal according to any embodiment of the present disclosure.

From the above description of the embodiments, those skilled in the art can understand that the present disclosure can be implemented by software and necessary general-purpose hardware, and can also be implemented by hardware, the former in many cases being a better embodiment. Based on such an understanding, the technical solution according to the present disclosure can be embodied in the form of a software product, and the computer software product can be stored in a computer-readable storage medium, such as a floppy disk, a read-only memory (ROM), a random-access memory (RAM), a flash memory (FLASH), a hard disk or an optical disk of a computer and includes one or more instructions, which, when executed by a computer device, cause the computer device, for example, a personal computer, a server, or a network device, or the like, to perform the method for processing images or the method for processing videos on the mobile terminal according to various embodiments of the present disclosure.

What is claimed is:

1. A method for processing images, comprising:
   determining an image attribute of each image block of a plurality of image blocks in a to-be-processed image;
   determining a filter model corresponding to each of the image blocks based on the image attribute of each of the image blocks; and
   acquiring a filtered image of the to-be-processed image by filtering each of the image blocks by the filter model corresponding to each of the image blocks,
   wherein the image attribute comprises a first hash value and a second hash value, and each of the image blocks corresponds to image gradients in a first direction and a second direction; wherein
   the first hash value is configured to indicate whether an image gradient corresponding to each of the image blocks weighs more in the first direction or in the second direction; and the second hash value is configured to indicate a proximity between the image gradient corresponding to each of the image blocks in the first direction and the image gradient corresponding to each of the image blocks in the second direction;
   wherein determining the image attribute of each image block of the plurality of image blocks in the to-be-processed image comprises:
   calculating, based on the image gradient of each of the image blocks in the first direction and the image gradient of each of the image blocks in the second direction, a square value of the image gradient corresponding to each of the image blocks in the first direction, a square value of the image gradient corresponding to each of the image blocks in the second direction, and a product value of the image gradient corresponding to each of the image blocks in the first direction and the image gradient corresponding to each of the image blocks in the second direction; and
   acquiring the first hash value and the second hash value corresponding to each of the image blocks by calculating the square value of the image gradient corresponding to the first direction, the square value of the image gradient corresponding to the second direction, and the product value of the image gradient corresponding to the first direction and the image gradient corresponding to the second direction based on an integral image algorithm.

2. The method according to claim 1, wherein determining the filter model corresponding to each of the image blocks based on the image attribute of each of the image blocks comprises:
   determining a bucket sequence number based on the first hash value and the second hash value corresponding to each of the image blocks; and
   determining the filter model corresponding to each of the image blocks based on the bucket sequence number.

3. The method according to claim 1, further comprising:
   determining the filter model of each image block according to an encoding noise intensity of the to-be-processed image; and
   acquiring the filtered image of the to-be-processed image by filtering each of the image blocks by the filter model corresponding to each of the image blocks comprises:
   acquiring the filtered image of the to-be-processed image by filtering each of the image blocks with a target model corresponding to each of the image blocks, wherein the target model corresponding to each of the image blocks comprises the filter model of each of the image blocks determined according to the encoding noise intensity of the to-be-processed image and the filter model corresponding to each of the image blocks determined based on the image attribute of each of the image blocks.

4. The method according to claim 3, wherein determining the encoding noise intensity of the to-be-processed image comprises:
   acquiring a quality parameter of video encoding corresponding to the to-be-processed image; and
   determining the encoding noise intensity of the to-be-processed image based on the quality parameter.

5. The method according to claim 1, further comprising:
   acquiring a binarized image of the to-be-processed image by binarizing the to-be-processed image.

6. The method according to claim 5, wherein acquiring the binarized image of the to-be-processed image by binarizing the to-be-processed image comprises:
   acquiring a text boundary image by performing Laplace filtering on the to-be-processed image, wherein the text boundary image comprises a text boundary region and a non-text boundary region;
   acquiring a first image by performing threshold segmentation on the text boundary image based on a preset pixel threshold, wherein the first image is an image with the non-text boundary region removed from the text boundary image; and
   acquiring the binarized image by performing a morphological close operation on the first image.

7. The method according to claim 6, wherein upon acquiring the binarized image, the method further comprises:
   performing mean filtering on the binarized image.

8. The method according to claim 6, wherein acquiring the binarized image by performing the morphological close operation on the first image comprises:
   acquiring a dilated image by dilating the first image; and
   acquiring the binarized image by eroding the dilated image.

9. The method according to claim 6, wherein acquiring the first image by performing threshold segmentation on the text boundary image based on the preset pixel threshold comprises:

comparing a pixel value corresponding to each pixel point in the text boundary image with the preset pixel threshold;

adjusting the pixel value corresponding to the pixel point greater than the preset pixel threshold to a first pixel value;

adjusting the pixel value corresponding to the pixel point less than or equal to the preset pixel threshold to a second pixel value; and determining the text boundary image with the pixel values adjusted as the first image.

10. The method according to claim 9, further comprising:

determining a ratio of a difference value between the first pixel value and the pixel value of the binarized image to the first pixel value as a first weight;

determining a ratio of the pixel value of the binarized image to the first pixel value as a second weight; and acquiring a denoised image of the to-be-processed image by adding a product value of the pixel value of the filtered image and the first weight to a product value of the pixel value of the to-be-processed image and the second weight.

11. The method according to claim 1, wherein training of the filter model comprises:

acquiring a high-definition image of a first preset size and a low-definition image carrying an encoding noise, wherein the high-definition image and the low-definition image have a same resolution;

extracting a plurality of image blocks of a second preset size from the high-definition image and the low-definition image to compose a first matrix and a second matrix respectively, wherein the second preset size is less than the first preset size; and acquiring the filter model based on the first matrix and the second matrix according to a normal equation of a Least Square method.

12. The method according to claim 1, wherein the filter model and the image block have a same size.

13. The method according to claim 1, wherein prior to determining the filter model corresponding to each of the image blocks based on the image attribute of each of the image blocks, the method further comprises:

determining a plurality of filter models corresponding to the to-be-processed image according to an encoding noise intensity of the to-be-processed image; and determining the filter model corresponding to each of the image blocks based on the image attribute of each of the image blocks comprises:

determining the filter model corresponding to each of the image blocks from the plurality of filter models corresponding to the to-be-processed image based on the image attribute of each of the image blocks in the to-be-processed image.

14. A method for processing videos on a mobile terminal, comprising:

decoding a to-be-processed video pulled from a video stream;

extracting a video frame from the to-be-processed video;

acquiring a filtered image corresponding to the video frame by processing the video frame as a to-be-processed image by the method as defined in claim 1; and playing the video with the filtered image.

15. A computer device for processing images, comprising:
at least one processor; and
a memory, configured to store at least one program;

wherein the at least one processor, when running the at least one program, is caused to perform a method for processing images, the method comprising:

determining an image attribute of each image block of a plurality of image blocks in a to-be-processed image;

determining a filter model corresponding to each of the image blocks based on the image attribute of each of the image blocks; and acquiring a filtered image of the to-be-processed image by filtering each of the image blocks by the filter model corresponding to each of the image blocks, wherein the image attribute comprises a first hash value and a second hash value, and each of the image blocks corresponds to image gradients in a first direction and a second direction; wherein the first hash value is configured to indicate whether a direction of an image gradient corresponding to each of the image blocks weighs more in the first direction or in the second direction; and the second hash value is configured to indicate a proximity between the image gradient corresponding to each of the image blocks in the first direction and the image gradient corresponding to each of the image blocks in the second direction;

wherein determining the image attribute of each image block of the plurality of image blocks in the to-be-processed image comprises:

calculating, based on the image gradient of each of the image blocks in the first direction and the image gradient of each of the image blocks in the second direction, a square value of the image gradient corresponding to each of the image blocks in the first direction, a square value of the image gradient corresponding to each of the image blocks in the second direction, and a product value of the image gradient corresponding to each of the image blocks in the first direction and the image gradient corresponding to each of the image blocks in the second direction; and acquiring the first hash value and the second hash value corresponding to each of the image blocks by calculating the square value of the image gradient corresponding to the first direction, the square value of the image gradient corresponding to the second direction, and the product value of the image gradient corresponding to the first direction and the image gradient corresponding to the second direction based on an integral image algorithm.

16. A non-transitory computer-readable storage medium storing a computer program, wherein the computer program, when run by a processor, causes the processor to perform a method for processing images, the method comprising:

determining an image attribute of each image block of a plurality of image blocks in a to-be-processed image;

determining a filter model corresponding to each of the image blocks based on the image attribute of each of the image blocks; and acquiring a filtered image of the to-be-processed image by filtering each of the image blocks by the filter model corresponding to each of the image blocks, wherein the image attribute comprises a first hash value and a second hash value, and each of the image blocks corresponds to image gradients in a first direction and a second direction; wherein the first hash value is configured to indicate whether a direction of an image gradient corresponding to each of the image blocks weighs more in the first direction or in the second direction; and the second hash value is configured to indicate a proximity between the image gradient corresponding to each of the image blocks in the first direction and the image gradient corresponding to each of the image blocks in the second direction;

wherein determining the image attribute of each image block of the plurality of image blocks in the to-be-processed image comprises:

calculating, based on the image gradient of each of the image blocks in the first direction and the image gradient of each of the image blocks in the second direction, a square value of the image gradient corresponding to each of the image blocks in the first direction, a square value of the image gradient corresponding to each of the image blocks in the second direction, and a product value of the image gradient corresponding to each of the image blocks in the first direction and the image gradient corresponding to each of the image blocks in the second direction; and acquiring the first hash value and the second hash value corresponding to each of the image blocks by calculating the square value of the image gradient corresponding to the first direction, the square value of the image gradient corresponding to the second direction, and the product value of the image gradient corresponding to the first direction and the image gradient corresponding to the second direction based on an integral image algorithm.

17. The method according to claim 1, further comprising:
determining the filter model of each image block according to an encoding noise intensity of the to-be-processed image; and
acquiring the filtered image of the to-be-processed image by filtering each of the image blocks by the filter model corresponding to each of the image blocks comprises:
acquiring the filtered image of the to-be-processed image by filtering each of the image blocks with a target model corresponding to each of the image blocks, wherein the target model corresponding to each of the image blocks comprises the filter model of each of the image blocks determined according to the encoding noise intensity of the to-be-processed image and the filter model corresponding to each of the image blocks determined based on the image attribute of each of the image blocks.

18. The method according to claim 2, further comprising:
determining the filter model of each image block according to an encoding noise intensity of the to-be-processed image; and
acquiring the filtered image of the to-be-processed image by filtering each of the image blocks by the filter model corresponding to each of the image blocks comprises:
acquiring the filtered image of the to-be-processed image by filtering each of the image blocks with a target model corresponding to each of the image blocks, wherein the target model corresponding to each of the image blocks comprises the filter model of each of the image blocks determined according to the encoding noise intensity of the to-be-processed image and the filter model corresponding to each of the image blocks determined based on the image attribute of each of the image blocks.

* * * * *